Figure 1:
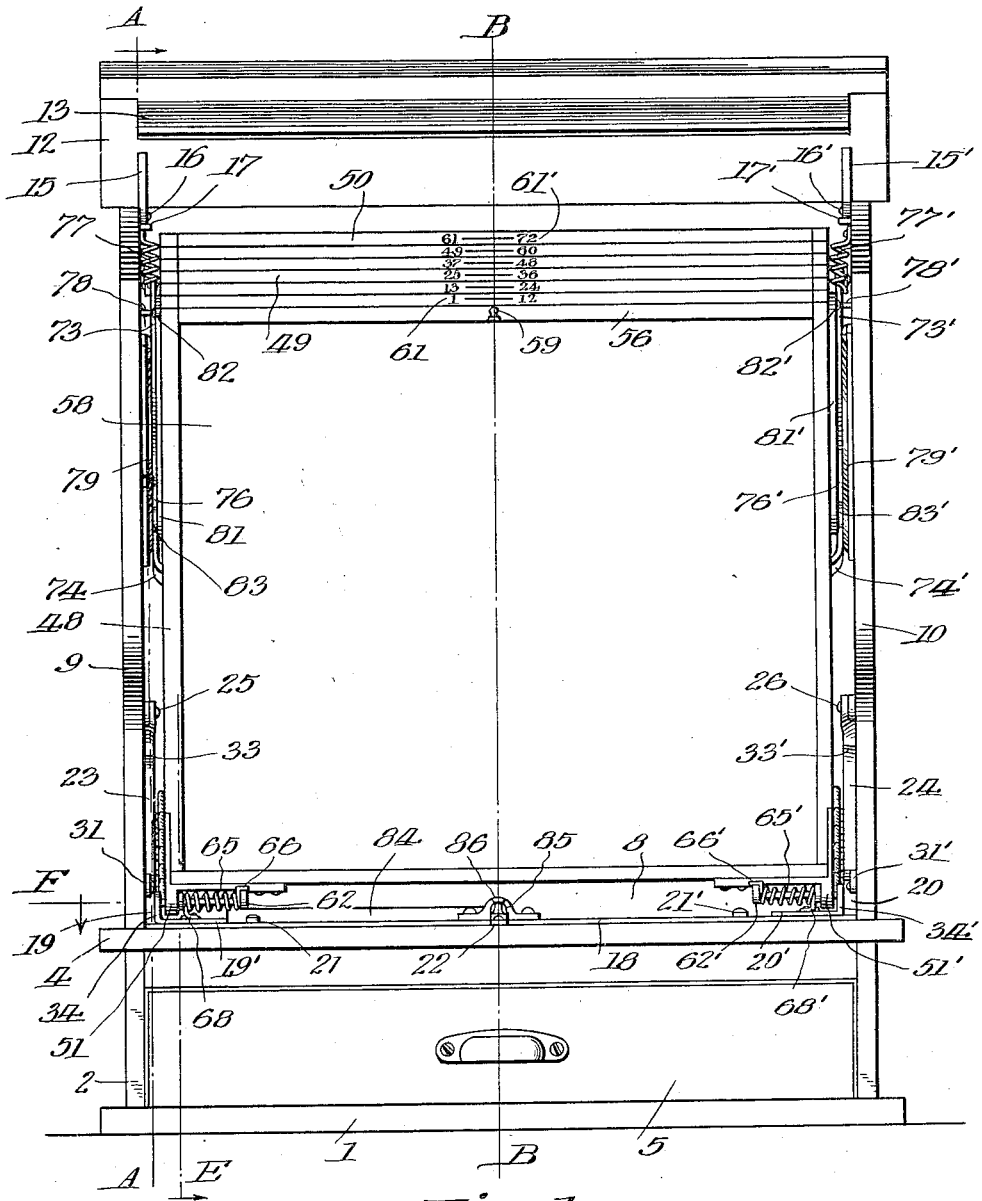

E. T. SILVIUS.
FILING APPLIANCE.
APPLICATION FILED MAY 4, 1909.
1,142,122.
Patented June 8, 1915.
6 SHEETS—SHEET 2.
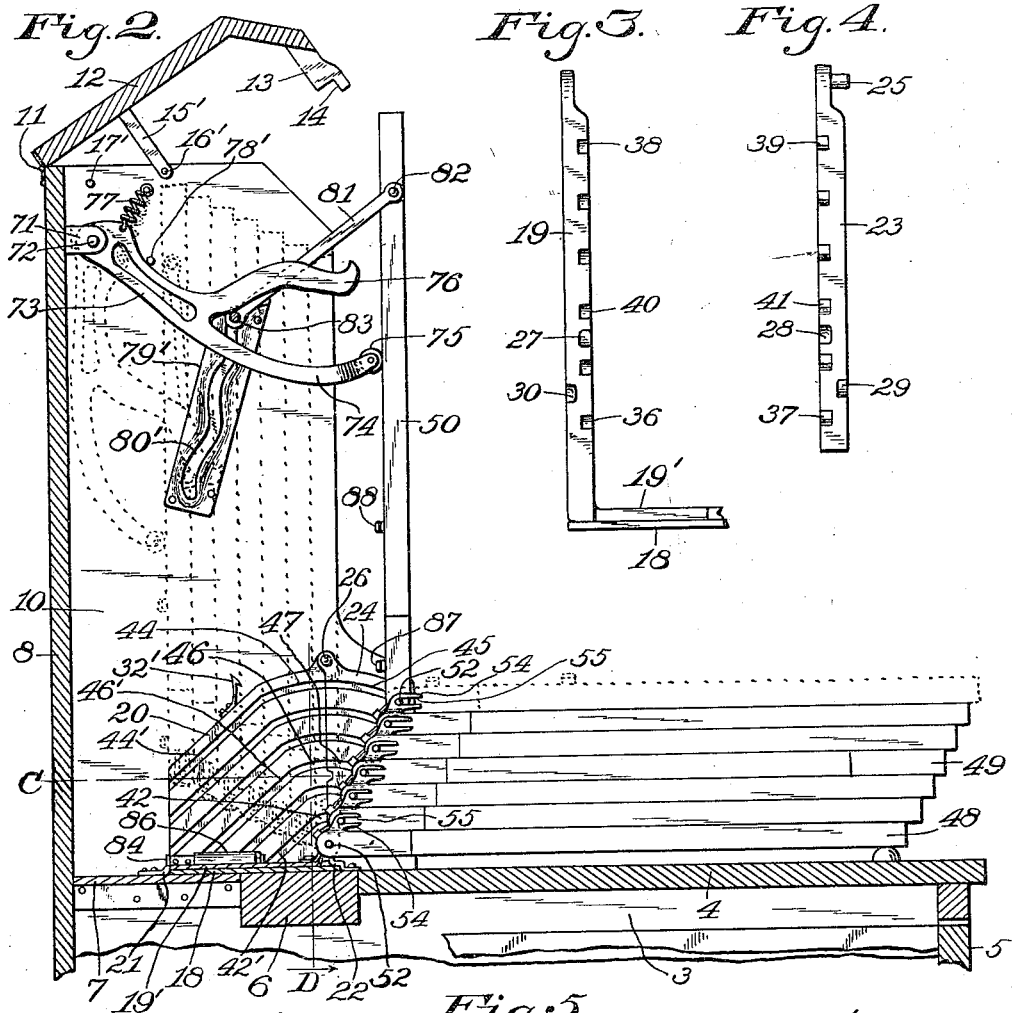
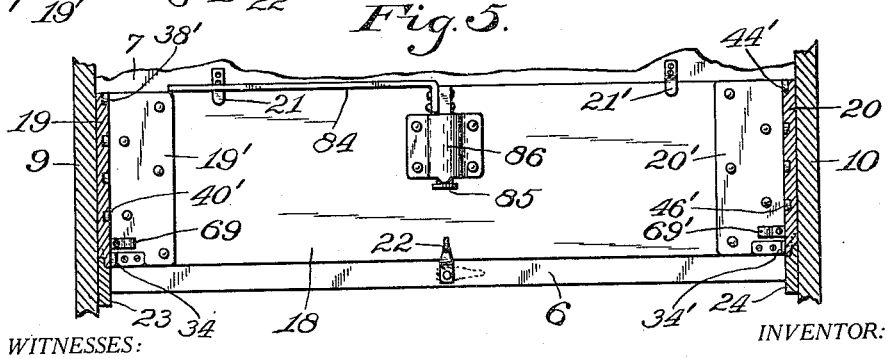
WITNESSES:
J. H. Gardner.
H. W. Hardwicke.
INVENTOR:
Ellis T. Silvius.

E. T. SILVIUS.
FILING APPLIANCE.
APPLICATION FILED MAY 4, 1909.
1,142,122.
Patented June 8, 1915.
6 SHEETS—SHEET 3.
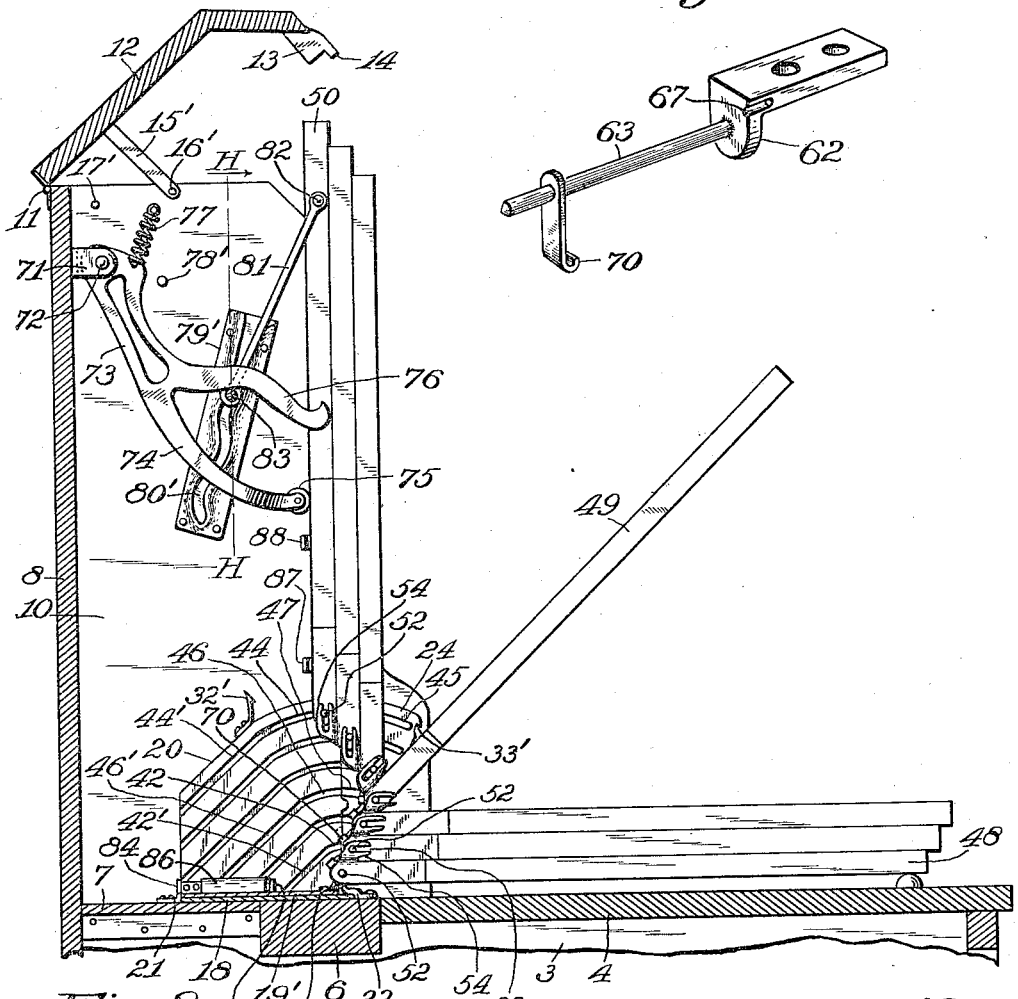
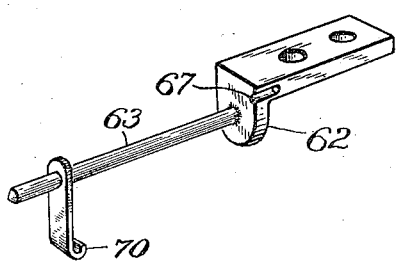
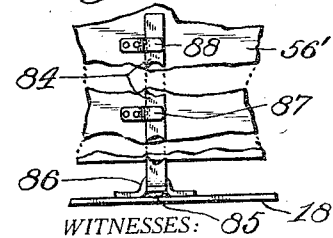
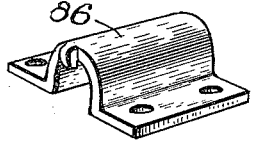
WITNESSES:
J. H. Gardner
H. W. Hardwicke
INVENTOR.
Ellis T. Silvius E. T. SILVIUS.
FILING APPLIANCE.
APPLICATION FILED MAY 4, 1909.
1,142,122.
Patented June 8, 1915.
6 SHEETS—SHEET 4.
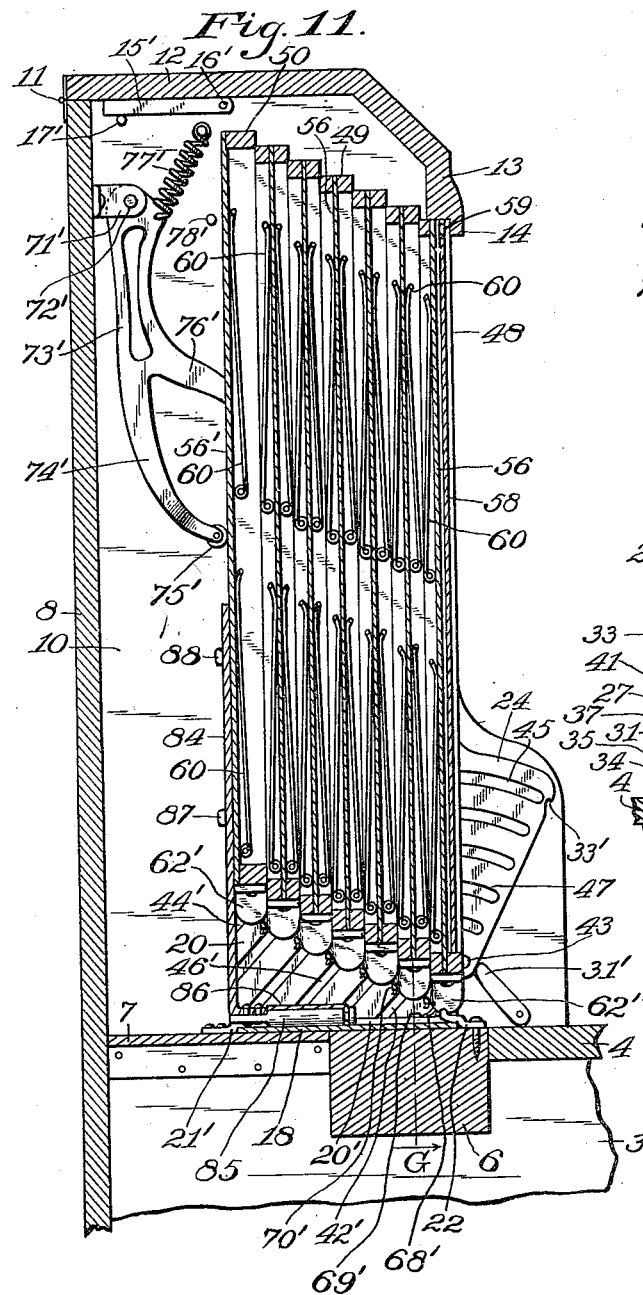
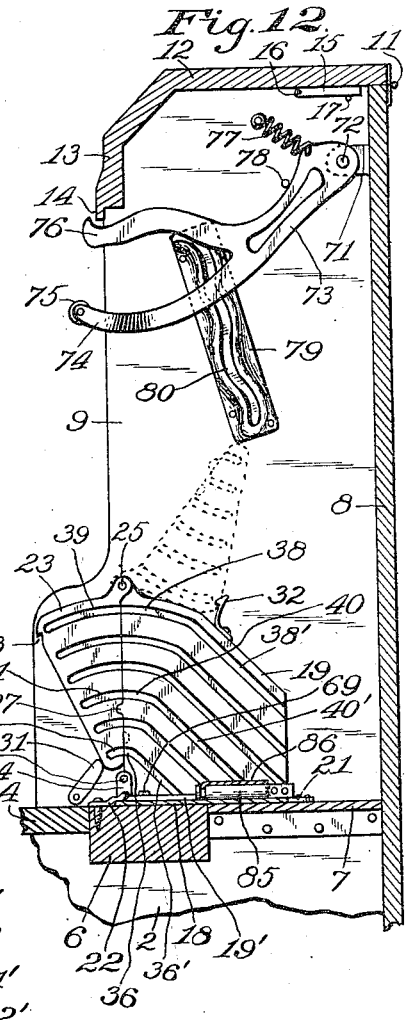
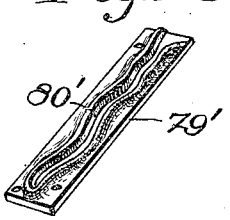
WITNESSES:
J. H. Gardner
H. H. Hardwicke
INVENTOR:
Ellis T. Silvius

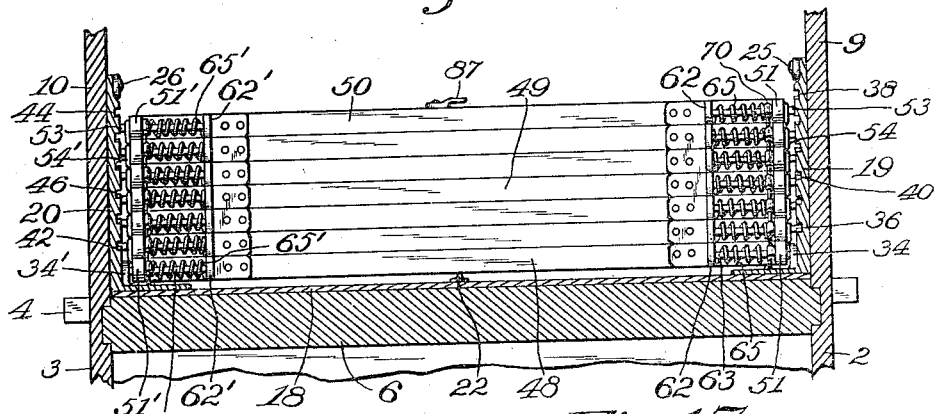
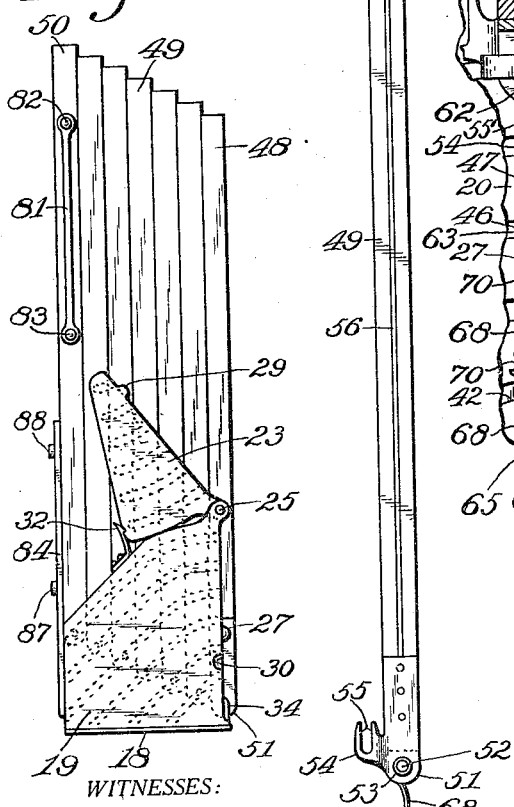
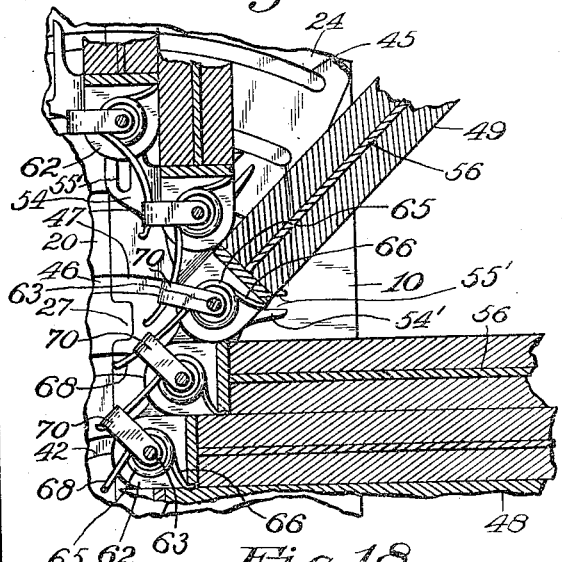
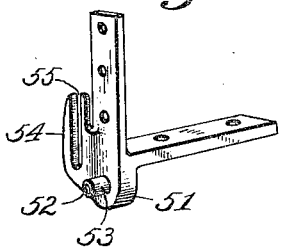

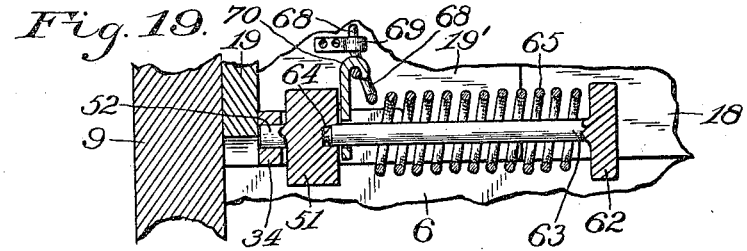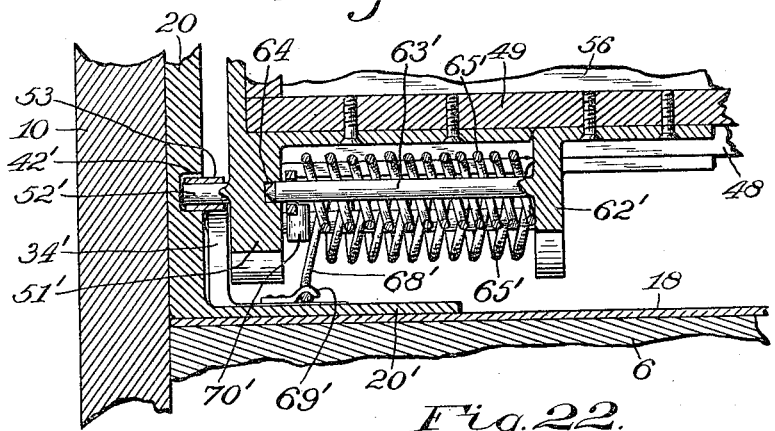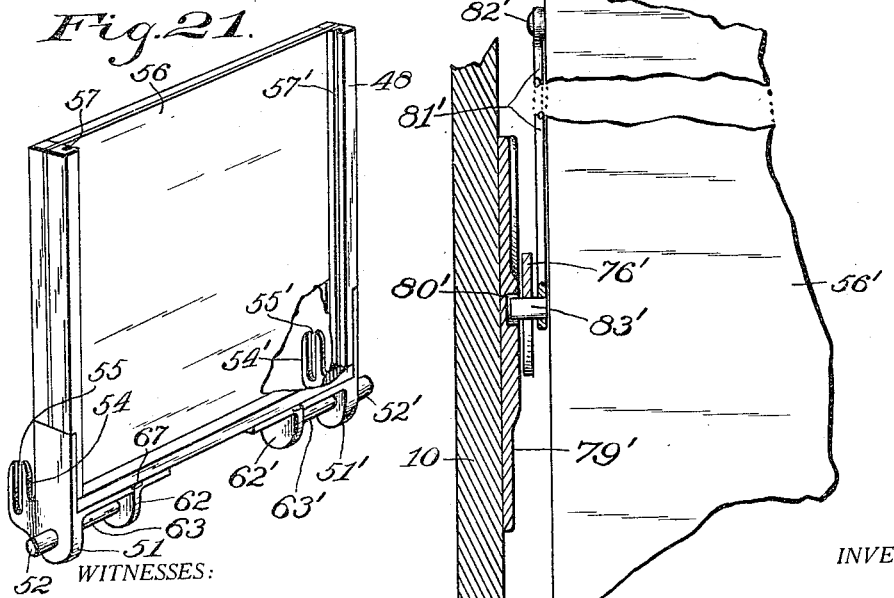

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,142,122.            Specification of Letters Patent.         Patented June 8, 1915.

Application filed May 4, 1909. Serial No. 493,923.

*To all whom it may concern:*

Be it known that I, ELLIS T. SILVIUS, a citizen of the United States, residing at Indianapolis, in the county of Marion and State of Indiana, have invented certain new and useful Improvements in Filing Appliances; and I do declare the following to be a full, clear, and exact description of the invention, reference being had to the accompanying drawings, and to the letters and figures of reference marked thereon, which form a part of this specification.

This invention relates to filing systems, and it has reference particularly to filing appliances or registers in which documents or records may be systematically filed or preserved for future reference; especially duplicate bills of sales commonly used in keeping credit accounts in a convenient manner in lieu of account books.

An object of the invention is to provide improvements in the mountings of receptacles or holders for preserving the documents or papers in indexed arrangement, in order that the holders may be arranged most conveniently, so as to be readily accessible for inspection of the papers; another object being to provide reasonably cheap apparatus whereby the document holders constructed as frames or leaves may be supported in upright positions in a casing or a cabinet with the rearmost frames in higher planes than the foremost frames, so that indexing characters on the fronts of the upper portions of the frames may all be seen conveniently at one time.

A further object is to provide improved mountings whereby the frames may be supported, so that they may be drawn forward to reclining positions, so that the upper frames will be conveniently near to the operator when the frames thus comprise a pile of considerable height; and a still further object is to provide mountings for supporting the frames, so that when a number of the frames are drawn forward and thus form a pile, the remaining frames may stand in upright positions and be drawn forward to positions nearer to the operator at the front of the cabinet than the position originally occupied by the foremost frame, in order that the operator may easily reach the rearmost leaves to have access to the documents or papers thereon.

A still further object is to provide accurately operating apparatus whereby when any of the frames are drawn forward to reclining positions and the lower ends of the remaining frames are automatically drawn forward, the tops of the upright frames will be advanced or brought forward with precision in the same degree as the lower ends of the frames, in order that the upper portions of the frames may be as convenient as the lower portions thereof to the operator or attendant.

Another and not less important object is to provide improved balancing apparatus for normally holding the frames individually in upright or perpendicular positions and assisting in moving them from reclining to upright positions while permitting the frames to be moved forward or rearward in the case or cabinet; and a still further object is to provide improvements whereby the frames may be removed as a group from the case or cabinet for safe storage when not in use.

With the above-mentioned and other objects in view, the invention consists in an improved filing appliance for systematically filing bill slips or other papers, and comprising a case or cabinet, novel guides having a base and mounted removably in the cabinet, a plurality of bill holding frames arranged in a group, the foremost one of the frames being pivotally supported on the base of the guides, and the remaining frames having pivots that are supported movably on the guides and controlled in their movements with respect to the guides, each by the frame next forward thereof; the invention comprising also an adjustable abutment controlled by the rearmost bill holding frame for maintaining the frames when upright in precise perpendicular arrangement during their forward and rearward movements.

The invention comprises also novel means for connecting bill holding frames operatively together, and also in the parts, and combinations and arrangements of parts, as hereinafter particularly described and then defined in the accompanying claims.

Referring to the drawings Figure 1 is a front elevation of a filing appliance, embodying my invention as arranged for use; Fig. 2, a fragmentary vertical sectional view approximately on the planes of the line A A in Fig. 1; Fig. 3, a front elevation of the main part of one of the guide plates; Fig. 4, a rear elevation of the supplemental part of the guide plate; Fig. 5, a fragmentary horizontal sectional view approximately on the line C in Fig. 2; Fig. 6, a fragmentary vertical sectional view approximately at the plane of the line A A in Fig. 1, showing parts of the apparatus in positions different from those shown in Fig. 2; Fig. 7, a perspective view of parts of the mountings of the springs for balancing the frames; Fig. 8, a fragmentary rear elevation showing means for locking the frames when removed from the frame case; Fig. 9, a perspective view of the journal of the locking-bar; Fig. 10, a perspective view of the housing for the locking bar journal; Fig. 11, a fragmentary vertical sectional view on the line B B in Fig. 1; Fig. 12, a fragmentary vertical sectional view on the line B B in Fig. 1 without the bill holding leaves, and viewed in the opposite direction to Fig. 11; Fig. 13, a perspective view of one of the guides of the adjustable abutments; Fig. 14, a fragmentary vertical sectional view approximately on the line D in Fig. 2 looking forward; Fig. 15, a side elevation of the bill holding frames grouped together and arranged for safe storage out of the case or cabinet; Fig. 16, a side elevation of one of the bill holding frames; Fig. 17, a fragmentary vertical sectional view as at the plane of the line E in Fig. 1 with the frames in different positions; Fig. 18, a perspective view of one of the parts of the frames by which they are pivotally supported, and also connected with adjacent frames; Fig. 19, a fragmentary horizontal sectional view at the plane of the line F in Fig. 1; Fig. 20, a fragmentary vertical sectional view approximately on the line G in Fig. 11 looking forward; Fig. 21, a perspective view of the main part of the foremost bill holding frame with parts thereof broken away; and Fig. 22 a fragmentary vertical sectional view approximately at the plane of the line H H in Fig. 6, showing the rear side of the rearmost frame in elevation.

Similar reference characters throughout the drawings indicate corresponding elements or features of construction referred to herein.

The invention comprises any suitable number of frames that may be desired for holding the documents or bill slips, and a suitable support for the frames preferably comprising a housing or cabinet to partially inclose the frames when in their normal upright positions and adapted to support the frames when drawn forward to reclining positions, the casing or housing being preferably adapted to be used as a writing desk. In the preferred construction the cabinet comprises a bottom 1, two sides 2 and 3, a desk top 4 on the top of the forward portions of the sides, and a drawer 5 in the forward portion of the desk part; a base member 6 extending between the sides 2 and 3 at the rear end of the desk top 4 and a floor 7 extending from the base member 6 rearward, the cabinet having a back 8 joined to the sides and extending upward a suitable distance above the rear ends of the sides. Two case sides 9 and 10 extend from the back forward a suitable distance to inclose the frames and support parts of the apparatus. The upper portion of the back 8 is provided with hinges 11 to which a cover 12 is attached that normally rests on the sides 9 and 10 and preferably has a downward extending front portion 13 having a downward extending lip 14 at the front thereof. Two props 15 and 15' are connected by pivots 16 and 16' to the sides 9 and 10, the props normally resting upon supports 17 and 17' that are attached to the sides and may be used for propping up the cover 12 when the register is in use. The member 6 comprises a part of the floor of the compartment for the bill holding frames formed by the back 8 and sides 9 and 10.

A base plate 18 normally rests horizontally on the member 6 and the floor 7, and it has two guide plate main parts 19 and 20 attached to the ends thereof or formed thereon, but preferably secured by flanges 19' and 20' formed on the guide plates and secured to the base plate. The base plate 18 is of rigid form, so as to support the guide plates 19 and 20 unyielding against the inner sides of the cabinet sides 9 and 10. A pair of fingers 21 and 21' are secured to the floor plate 7 and securely hold the base plate 18 in its proper position at the rear end thereof, and a button 22 mounted on the member 6 secures the front end of the base plate firmly, but permitting the base plate to be withdrawn from under the fingers 21 and 21' for removal from the cabinet. The main part 19 of the guide plate has a supplemental part 23 to be used therewith, and the main part 20 has a supplemental guide plate part 24 to be used therewith, the supplemental parts being preferably connected to the main parts by hinge-pins 25 and 26 at their upper portions, so that the supplemental parts may swing up onto the tops of the main parts of the guide-plates. The supplemental parts are suitably designed, so as to be maintained in register or alinement with the main parts at their joint faces, preferably by means of projections 27 entering recesses 28 at one side, and projections 29 entering recesses 30 at the opposite side. Locking devices 31 and 31', preferably cam shaped, are mounted on the inner sides of the cabinet sides 9 and 10 that engage the supplemental parts and lock them securely against the main parts of the guide-plates, and may be withdrawn to release the supplemental parts so that they may swing on their hinges. Latches 32 and 32' are mounted on the tops of the main parts 19 and 20 and are adapted to engage shoulders 33 and 33' formed on the fronts of the supplemental parts, when the supplemental parts are swung up onto the main parts. A pair of pivoting-stands 34 and 34' are securely mounted on the top of the base-plate 18 at the forward end thereof and adjacent to the insides of the guide-plates, each stand having a circular pivot bearing 35 therein. The guide-plates are provided with suitable guides at the inner sides thereof, and the guides preferably are formed as grooves in the inner faces of the plates, the main part 19 having a curved groove 36 from which continues a groove 36' that is preferably straight and extends downward and rearward from the curved groove 36, the latter being planned as a segment of a circle struck from the center of the bearing 35, the supplemental part 23 having a curved groove 37 registering with the groove 36 and extending forward toward, but not entirely to the front edge of the supplemental part, the groove 37 being also a segment of a circle corresponding to the curvature of the groove 36, being concentric to the axis of the bearing 35. The part 19 has also another curved groove 38 in the upper portion thereof from which continues a groove 38' that is parallel to the groove 36' and the part 23 has a curved groove 39 continuing from the groove 38 concentric to the groove 37. A suitable number of other grooves 40 and 40' are formed in the part 19, and grooves 41 are formed in the part 23, all the curved grooves being concentrically arranged and the grooves extending therefrom being parallel one to another. The main part 20 has a curved groove 42 from which continues a groove 42' corresponding to the grooves 36 and 36', and the part 24 has a groove 43 registering with the groove 42 and continuing forward; the upper portion of the parts 20 having curved groove 44 from which continues a groove 44', and a curved groove 45 is formed in the part 24 in register with the groove 44. Other intermediate curved grooves 46 are formed in the part 20 and from which extend inclined grooves 46', the part 24 having a suitable number of grooves 47 registering with the grooves 46. All the grooves that extend downward and rearward from the curved grooves in the main parts of the guide plates are preferably, though not necessarily straight, and the guide grooves in either sectional guide-plate are opposite to the grooves in the opposite guide-plate and correspond therewith in contour.

A convenient number of bill holding frames or filing leaves are employed, there being a forward frame 48, a plurality of intermediate frames 49, and a rear frame 50, all having pivoting ends that are supported in the case or cabinet, so that the opposite or free ends may swing from upright to substantially horizontal positions. The pivoting end of each frame has two pivoting ears 51 and 51' thereon provided with pivots 52 and 52' for supporting the frames movably and permitting pivotal movements thereof, the forward frame 48, however, not being movable except pivotally, the pivots 52 and 52' thereof being mounted in the bearings of the pivoting-stands 34 and 34'; and the pivots of the other frames are mounted in the guide-grooves that are formed in the pair of sectional guide-plates 19 and 20, the pivots of the frame next adjacent to the forward frame 48 being mounted movably in the guide-grooves next above and rearward of the axis of the pivots of the forward frame, each other frame having one pivot similarly mounted in a guide-groove of one guide-plate, and the other pivot in the guide-groove of the companion guide-plate, so that all the frames when upright may be close together, and when drawn forward will rest one upon another and the forward leaf supported by the top 4 of the desk part. The pivots of all the intermediate frames and the rear frame are preferably each provided with a roller 53 to permit of easy movements of the pivots in the guide grooves. Each frame except the rear frame 50 is provided with the two rearward extending arms 54 and 54' in which are guideways 55 and 55' respectively, the guideways extending longitudinally in planes rearward of the frames. The guideways receive the pivots of the adjacent frames next rearward in arrangement, so that when either one of the frames, except the rear frame, is moved forward it will draw the remaining frames forward, and also when moved forward pivotally will draw the remaining upright frames forward. When all the frames are drawn forward to reclining positions their pivots will be stopped by the ends of the guide-grooves in the supplemental parts of the guide-plates, and when all the frames stand upright they will be maintained in the desired positions, partly by the guide-grooves and partly by the arms 54 and 54' of the forward frames, the relative arrangement of the frames being such that the axes of their pivots collectively will be in an inclined plane, and therefore, the rearward leaves will extend higher than the tops of the forward leaves progressively with the result that the front face at the top of each frame is exposed to view. Each bill holding frame, except the rear one, comprises a plate 56 that is arranged midway between the forward and rear sides of the frame, the rear frame 50 having a plate 56' arranged at the rear side of the frame. The forward frame 48 has two guide-grooves 57 and 57' therein retaining a plate 58 provided with a finger-hold 59 for withdrawing the plate from the frame. The plate 58 may be used for various purposes, such as holding a record sheet or index sheet on the inner side thereof. The free end of the frame 48 may be engaged by the lip 14 with which the cover 12 is provided and obviously the cover may be suitably locked, if desired, to prevent operation of the frames by unauthorized persons. The inner side of the plate 56 of the forward frame 48 has bill-clips 60 thereon, similar bill-clips being mounted on both front and rear sides of the plates of the intermediate frames, and on the forward or inner side of the plate 56', the terms forward and rearward being understood as having reference to the frames when in normal upright positions. The upper forward portion of the frames, except the forward one, have index characters, as 61 and 61' thereon all clearly exposed to view, and of sufficiently large size to be easily read hurriedly by the attendant at the front of the cabinet.

The supported end of each bill holding frame has a pair of projections 62 and 62' thereon preferably formed separately and attached to the frames and arranged opposite to the pivoting ears of the frame, the projections having guide-rods 63 or 63' thereon extending to and entering a socket 64 in the opposite pivoting ear, each frame having a guide-rod at each side thereof, and balancing springs 65 and 65' are mounted on the guide-rods, there being a spring between each pivoting ear and a projection 62 or 62', so that each bill holding frame is provided with two balancing springs, the balancing springs having arms 66 and 66' engaging the projections preferably in recesses 67 in the forward sides of the projections, there being an arm on one end of each spring, and the opposite ends of the springs having arms 68 and 68' thereon for preventing rotation of the springs on their guide-rods. The arms 68 and 68' of the springs that are provided for the forward frame 48 engage clips 69 and 69' that are secured to the base-plate 18, and the corresponding arms of the springs with which the remaining frames are provided engage stirrups 70 that are hung on the guide-rods of all of the frames except the rear frame, the stirrups being adjacent to the inner sides of the pivoting ears of the frames, the arrangement of the anchoring arms of the springs being such that the arms of the springs on the rearward frames extend to and engage the stirrups that are on the guide-rods of the next adjacent forward frames. It is designed that the balancing springs shall have only sufficient tension to hold the frames in upright positions and permit them to lie horizontally when loaded with documents or papers, and obviously the tension of the springs for some of the frames may be greater or less than the tension required for other frames, and it is obvious that each frame may be provided with only one spring if so desired, and that the tension of either spring may be changed if desired to a greater or lesser degree, and if broken may be readily replaced with a new one by first detaching the projection 62 or 62' from the frame.

In order to maintain the frames in precise vertical positions improved paralleling apparatus is provided and comprising a pair of pivoting blocks 71 and 71' that are mounted in the upper rear portion of the case or cabinet and have pivots 72 and 72' that are arranged in proximity to the back 8 and the sides 9 and 10, arms 73 and 73' being mounted on the pivots and having branches 74 and 74' provided with rollers 75 and 75' engaging the rear side of the rear frame 50, the arms having also branches 76 and 76' extending between the sides of the frames and sides 9 and 10 of the case or cabinet. Springs 77 and 77' are preferably employed and supported by the sides 9 and 10 and are connected to the arms 73 and 73' to hold them against stops 78 and 78', attached to the sides 9 and 10, when the frames are removed from the case or cabinet. A pair of guide-plates 79 and 79' are attached to the inner sides of the sides 9 and 10 and have suitable guides thereon formed preferably as grooves 80 and 80' in the inner sides thereof. A pair of stiff links 81 and 81' are connected by pivots 82 and 82' to opposite sides of the frame 50, the links having guide-pins 83 and 83' on the free ends thereof that engage the under sides of the branches 76 and 76' and extend into the grooves 80 and 80'. The guide slots 80 and 80' are preferably formed of a series of substantially straight and curved portions so arranged that the pins 83 and 83' will traverse a path corresponding to the path of movement of the pivot pin for the rearmost leaf as it is moved forwardly and upwardly upon the operation of each of the forward leaves successively. The effect of this arrangement of the slots 80 and 80' in coöperation with the links 81 and 81' and arms 73 and 73' is to maintain the rearmost leaf and all those leaves which remain upright in predetermined position as they are moved forwardly by the operation of the front or succeeding leaves. The under sides of the branches 76 and 76' are suitably curved to coöperate with the links 83 and 83' and the guide-grooves 80 and 80', the contours thereof being designed in accordance with the positions of the guide-plates with respect to other parts of the apparatus, all being preferably arranged approximately as shown with the guide-grooves extending in up and down directions. The rear frame 50 is normally held against the rollers 75 and 75′ by the balancing springs of the frame, and when the frame moves either upward on the inclined guides, or forward it will cause the arms 73 and 73′ to move upward pivotally, so that the rollers 75 and 75′ will swing forward and thus move the upper portion of the frame to the same extent as the lower end of the frame may be moved forward and, of course, the reverse will occur with rearward and downward movement of the frame. When the frame is moving rearward its balancing springs will push the arms, comprising the abutments, downward and rearward and the different positions of the abutments will be controlled by the rear frame through the means of the links 81 and 81′ and the guides and guide-pins and the branches 76 and 76′ hereinbefore described. It will be clear, therefore, that when the rear frame 50 is stationary in upright position the remaining frames will be stopped thereby or guided in perpendicular arrangement, and that in the various adjusted positions the frames will always stand precisely in parallel vertical planes. When it is desired to move the frames from the cabinet the guide-pins 83 and 83′ will be withdrawn from the guide-grooves 80 and 80′, and the links 81 and 81′ will hang at the sides of the rear frame.

In order to conveniently hold the group of frames together in positions perpendicular to the base-plate 18 when removed from the case or cabinet, a locking-bar 84 is provided that has a journal 85 extending at right angles thereto, and the journal is mounted on the base-plate 18 by means of a housing 86, so that the locking-bar may lie on the base-plate or swing up to a position at right angles thereto. The rear frame 50 is provided with two lock-plates 87 and 88 adapted to be engaged by the locking-bar when the latter is swung up against the rear sides of the frame whereby the frame is prevented from moving pivotally, and the other frames, as will be understood, are pushed toward the rear frame and stopped thereby as a result of the action of their balancing springs.

In the drawings the frames are represented as being horizontal when drawn forward to reclining positions and it is preferable that they be so arranged, but it is obvious that their mountings may be slightly modified so that they may rest in slightly inclined positions, if desired, and also it may be designed that the frames when upright may be slightly inclined if so desired. And in lieu of the bill-clips on the frames it is obvious that the frames may be otherwise designed to hold papers of various kinds. Also various other modifications may fairly be made within the scope of the claims, as for instance one adjustable abutment for the frames may in some cases be sufficient.

In practical use the frames will normally stand substantially as shown in Figs. 1 and 11, and when it is desired to operate the frames the cover 12 will be propped up, so that the indexing of the frames may be clearly seen and the frames be permitted to be drawn forward as illustrated in Figs. 2 and 6. The bill slips or other papers will be suitably held on the frames as by means of the clips 60, so that when one or more of the frames are drawn down the remaining frames will be drawn forward equal distances at their tops and bottoms and the papers on the front of the foremost frame conveniently accessible, while the papers on the top of the uppermost reclining frame will also be accessible to the attendant. It will be noticed that the supported ends of the frames are rounded, and that when either frame is in horizontal position the next adjacent frame if in upright position will be in contact with the under frame, so that if the under frame be moved upward pivotally it will by reason of the contact assist in starting the upper frame to move rearward on its guides while the balancing springs of the upper leaf will assist also in pushing it up during the initial movements of the upper frame, the upward movement being continued by means of the connecting arms of the lower frame engaging the pivots of the upper frame slidingly. The actions of the paralleling apparatus including the adjustable abutments it is thought will be clearly understood from the foregoing description thereof and with reference to the drawings showing the apparatus in different positions and in broken lines. When it is desired to remove the frames to a place of safety, as may be desired at the close of business hours, the button 22 may be turned to release the base-plate 18 after which the base-plate containing the guide-plates and supporting the frames may be removed from the cabinet and then the supplemental parts of the guide-plates may be swung up and latched on the tops of the main parts of the guide-plates at the sides of the frames, and the locking-bar 84 may be swung up into engagement with the locking-plates 87 and 88 and the back of the rear frame 50 so that the frames will be held upright, as shown in Fig. 15, and have a horizontal supporting base on which to stand, the whole group and supports thereof occupying but little more space than the frames alone.

Having thus described the invention, what is claimed as new is—

1. A credit accounting register including a base plate, a pair of pivot bearings secured on the base plate, a pair of guide-plates on opposite ends of the base plate having each a plurality of guide grooves therein, a plurality of normally upright frames having each a pair of pivots extending from its opposite sides, and a pair of arms carried by each of the frames except the rearmost one having guideways formed therein, the pivots of the foremost frame being mounted in the pivot bearings, and the pivots of the remaining frames extending through the guideways of the arms and into the guide grooves of the guide-plates, whereby said frames are connected together, all of the frames being movable to approximately horizontal positions.

2. The combination of a casing provided with a plurality of alined guides in its opposite sides, a series of frames normally arranged face to face and each provided with pivots extending from the opposite sides thereof, the pivots of one end frame of the series being fixed and the pivots of each of the remaining frames projecting into a pair of alined guides, and a pair of arms carried by each of the frames except the opposite end frame, said arms being formed with guide ways through which the pivots of the adjoining frame extend, whereby said frames are connected together, and the guide ways being open at one end to permit the detachment of the frames from each other.

3. A credit-accounting register including a base plate, a pair of pivot-bearings secured on the base plate, a plurality of normally upright frames normally assembled together face to face, means for movably supporting said frames on the base, the said means including connections between the frames operating when one or more of them are reclined to move the lower ends of the remaining frames forwardly, pins mounted on the frames, one on each frame in alinement with the pivots thereof, and all but one having each a stirrup thereon, and springs on the guide-pins and having each an arm coöperating with the frame in proximity to the guide-pin, the spring for the foremost frame having also an arm anchored on the base, and the springs for the remaining frames having each an arm extending into the stirrup that is on the guide-pin of the frame adjacent thereto.

4. A credit-accounting register including a base-plate, a pair of pivot-bearings rigid on the forward end of the base plate, a pair of guide-plates on the base-plate and having each a plurality of guide-grooves therein, each guide-groove having a curved portion and a straight portion extending downward and rearward from the curved portion, a plurality of normally upright frames having each a pair of pivots, the pivots of the foremost one of the frames being mounted in the pivot-bearings and the pivots of the remaining frames extending into the guide-grooves, each frame excepting the rearmost frame having two arms thereon in which are slots receiving the pivots of the adjacent rearward frame, said arms supporting the pivots in the straight portions of said guide-grooves and acting to move the pivots into the curved portions of said guide-grooves when the forward frames are moved, said remaining frames being pivotally supported jointly by said guide-grooves and said arms, and means for supporting the base-plate rigidly.

5. A credit-accounting register including a base, two sectional guide-plates comprising each a main part secured to the base and a supplemental part hinged to the main part, said guide plates having curved concentrically-arranged guide-grooves therein that extend in the main parts and into and terminate in the supplemental parts, portions of the guide-grooves extending in the main parts tangentially from the curved portions of the guide-grooves downward and rearward, a pair of pivot-bearings rigid on the forward end of the base-plate, a plurality of frames, grouped together, the foremost one of the frames having pivots mounted on the pivot-bearings and the remaining frames having pivots mounted in said guide-grooves, means for connecting the frames together one with another, and means for securing the supplemental parts to the main parts of the guide-plates.

6. In a filing appliance, the combination of a casing provided with guides, a series of assembled leaves, means for pivotally supporting one end leaf of the series, devices carried by the remaining leaves movable on said guides and permitting pivotal movement of the leaves relative to each other, the said devices including connections between said leaves whereby their lower ends move to and fro when one or more of them are operated, the said guides extending forward and rearward from the pivot on which the end leaf is supported.

7. In a filing appliance, the combination of a series of leaves having connections between them operating, when one or more of the leaves are reclined, to move the remaining leaves forwardly, a stirrup carried by each leaf, and a balancing spring carried by each leaf having one arm anchored thereto and its other arm engaging the stirrup of an adjoining leaf.

8. In a filing appliance, the combination of a series of leaves having connections between them operating, when one or more of the leaves are reclined, to move the remaining leaves forwardly, and guide devices for the opposite ends of the leaves, each comprising a main guide plate and a supplemental guide plate adapted for registry with the main guide plate.

9. In a filing appliance, the combination of a series of leaves having pivots extending from their opposite ends and a connecting member between each leaf and the pivot of the adjoining leaf operating, when one or more of the leaves are reclined, to move the remaining leaves forwardly, and guide devices arranged to receive the pivots at the opposite ends of the leaves, each comprising a main guide plate and a supplemental guide plate adapted for registry with the main guide plate, the said connecting member being arranged between the adjoining leaf and the guide devices.

10. In a filing appliance, the combination of a series of leaves having connections between them operating, when one or more of the leaves are reclined, to move the lower ends of the remaining leaves forwardly and upwardly, and movable means operating to maintain the remaining leaves upright as their lower ends move forwardly, the said means permitting the rear leaf to move bodily in vertical directions during its forward and rearward movements.

11. In a filing appliance, the combination of a series of leaves, guide devices for the leaves permitting their forward and rearward movement and also a rotatable movement from a vertical to a horizontal position and vice versa, and connections between the leaves operating, when one or more of the leaves are reclined, to move the lower ends of the leaves forwardly, the said connections comprising pivots carried by each leaf, and an arm formed with a slot extending in a direction parallel to the leaves and adapted to slidingly and rotatively receive the pivot devices of an adjoining leaf.

12. The combination of a casing, a series of leaves, a pair of guide plates, mounted in the casing, each plate comprising two separable sections provided with alined guides, and devices carried by said leaves having sliding engagement with said guides and permitting pivotal movements of the leaves relative to each other.

13. In a filing appliance, the combination of a casing, a series of pivotally mounted leaves arranged normally in upright position, the pivots permitting the leaves to swing into an inclined position, one relative to the other, and a laterally projecting member carried by each leaf, and formed with a slot to receive the pivot of an adjoining leaf and permit it to slide and rotate therein during the operation of a leaf.

14. In a filing appliance, the combination of a series of leaves, guide devices for the leaves permitting their forward and rearward movement and also to rotatable movement from a vertical to a horizontal position and vice versa, and connections between the leaves operating, when one or more of the leaves are reclined, to move the lower ends of the leaves forwardly, the said connections comprising a pivot, and a laterally projecting member carried by each leaf, the said member being formed with a slot extending in a direction longitudinal of the adjacent leaf and arranged to slidably and rotatably receive the pivot of an adjoining leaf.

15. In a filing appliance, the combination of a support provided with a series of guides arranged substantially parallel to each other, a series of leaves having its front leaf pivotally supported on said support and the remaining leaves having devices slidably mounted in the guides and permitting pivotal movement of the leaves relative to each other, and connections between the leaves operating, when one or more of the leaves are swung on their respective pivots, to move the lower edges of the remaining leaves toward the supported end leaf, the said guides terminating at points forward of the pivot on which the said front leaf is mounted and each guide also terminating at a point forward of the next adjacent lower guide.

16. A filing appliance including a plurality of assembled leaves having each a plurality of guideways and also a plurality of pivots, the pivots being mounted movably in the guideways of the adjacent leaves.

17. A filing appliance including a plurality of assembled leaves having each a plurality of guideways and also a plurality of pivots, the guideways extending longitudinally of the leaves, the pivots of the leaves being mounted to move in the guideways of the adjacent leaves both pivotally and longitudinally of the guideways.

18. A filing appliance including a case, a plurality of leaves normally arranged in upright position face to face, one of the end leaves being supported in the case, and each two adjacent leaves having coöperating connecting devices thereon, one of the devices being a pivot and the other a guide-bar extending longitudinally of the leaves and having free sliding engagement with the pivot.

19. In a filing appliance, the combination of a plurality of assembled leaves having each a guideway and a pivot, the pivot of one leaf being movably mounted in the guideway of an adjoining leaf and permitting said leaf to move or swing relative thereto, and means arranged to be placed under tension when one or more of said leaves are operated.

20. A filing appliance including a plurality of assembled leaves each having a plurality of guideways at one side and a plurality of pivots adjacent thereto, the pivots of the leaves being mounted movably in the guideways of the adjacent leaves.

21. A filing appliance including a plurality of leaves arranged face to face and having connections between them comprising devices mounted adjacent to each other, the device on each leaf being connected with the device on the adjoining leaf so that the leaves may move pivotally and may also slide longitudinally as one leaf is rotated to and from the other.

22. In a filing appliance, the combination of a plurality of filing leaves arranged face to face and normally in upright position, with freely shifting devices directly connecting the adjacent leaves together for pivotal and also longitudinal sliding movement of the pivots of each leaf relatively to the adjacent leaf as one is rotated to and from the other.

In testimony whereof, I affix my signature in presence of two witnesses.

ELLIS T. SILVIUS.

Witnesses:
HARRY D. PIERSON,
J. H. GARDNER.

Copies of this patent may be obtained for five cents each, by addressing the "Commissioner of Patents, Washington, D. C."